United States Patent [19]
Koizumi et al.

[11] Patent Number: 4,844,356
[45] Date of Patent: Jul. 4, 1989

[54] WIRE WINDER FOR A STATOR

[75] Inventors: Tetsuro Koizumi, Kanagawa; Masato Kamei, Tokyo, both of Japan

[73] Assignee: Kamei Machine Project Co., Ltd., Japan

[21] Appl. No.: 144,014

[22] Filed: Jan. 14, 1988

[30] Foreign Application Priority Data

Jul. 13, 1987 [JP] Japan ................... 62-172949

[51] Int. Cl.⁴ ............................................. H01F 41/10
[52] U.S. Cl. ................................. 242/11 R; 242/7.14
[58] Field of Search ............... 242/1.1 R1.1 A, 1.1 E, 242/7.14, 7.15, 7.16, 7.17, 7.18; 29/605, 732, 733, 736, 596

[56] References Cited
U.S. PATENT DOCUMENTS

| 2,718,359 | 9/1955 | Hunsdorf | 242/7.05 C |
| 3,973,738 | 8/1976 | Miller | 242/7.05 B |
| 4,634,063 | 1/1987 | Watanabe et al. | 242/1.1 R |
| 4,635,865 | 1/1987 | Arnold | 242/7.14 X |

FOREIGN PATENT DOCUMENTS

| 3516763 | 11/1985 | Fed. Rep. of Germany | 242/7.14 |
| 16518 | 1/1983 | Japan | 242/7.14 |
| 284579 | 12/1952 | Switzerland | 242/1.1 R |

Primary Examiner—Joseph J. Hall, III
Attorney, Agent, or Firm—Ostrolenk, Faber, Gerb & Soffen

[57] ABSTRACT

In construction of a wire winder for an elastic stator, a nozzle guiding a wire is driven for a compound three dimensional movement relative to the stator to wind the wire about terminal pins on the stator right after formation of the field winding.

2 Claims, 5 Drawing Sheets

WIRE WINDER FOR A STATOR

BACKGROUND OF THE INVENTION

The present invention relates to an improved wire winder for a stator, and more particularly relates to a winder which carries out wire winding on a terminal pin and formation of a field winding (in succession) on a stator sequentially.

In the conventional production of a stator, wire winding on a terminal pin is carried out separately from formation of its field winding. That is, a wire is first wound on a terminal pin by rotation of a flier. Next, formation of the field winding is carried out by a separate operational step using a different winder.

Such a separated processing in production, however, entails much labor and high production costs. In addition, with such a separated processing, it is quite difficult to streamline the production by means of automation.

SUMMARY OF THE INVENTION

It is the object of the present invention to enable winding of a wire about terminal pins on a stator directly and automatically after to formation of the field winding.

In accordance with the basic aspect of the present invention, a nozzle for a wire to be wound is driven, by two separate but synchronized drive sources, for a combination of a swing movement, a vertical movement and a horizontal rotation with respect to a stator in order to wind the wire about terminal pins on the stator in continuous succession to formation of the field winding.

DESCRIPTION OF THE PREFERRED EMBODIMENTS

Figure 1:
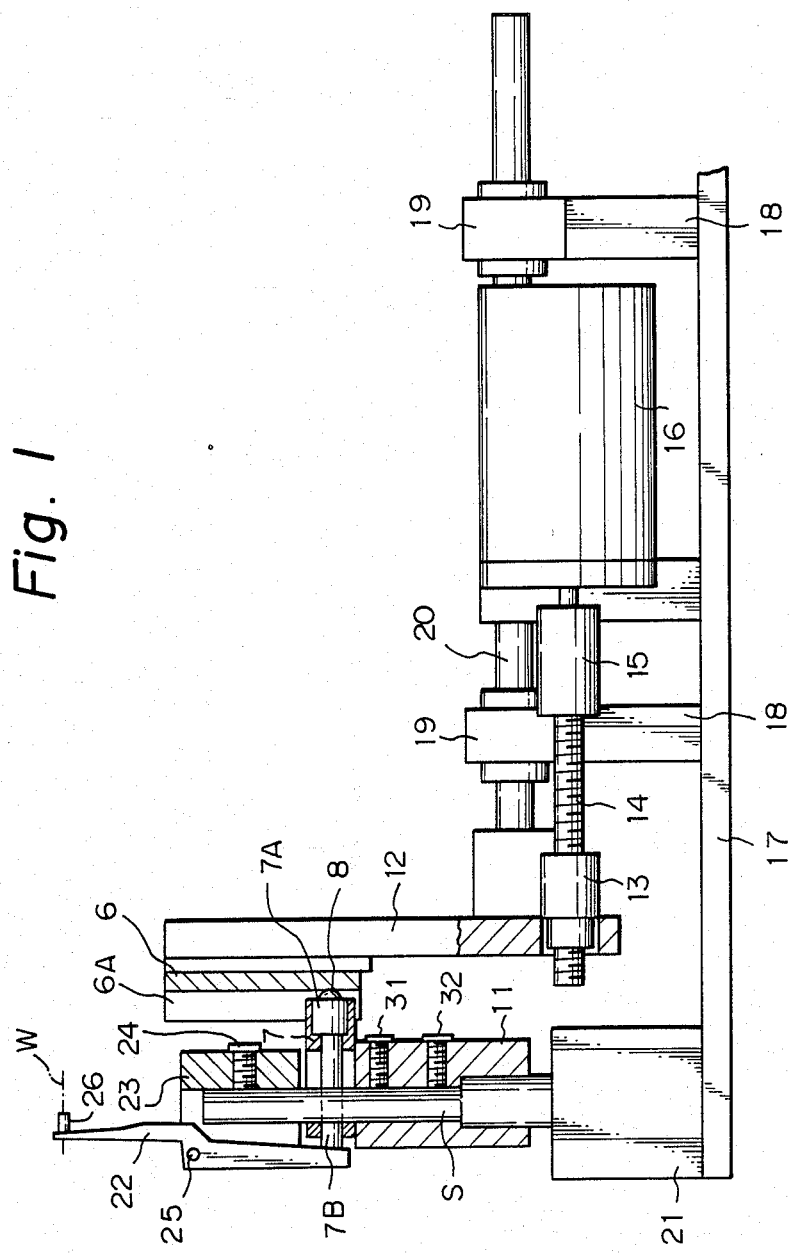
FIG. 1 is a side view, partly in section, of one embodiment of the wire winder in accordance with the present invention.
Figure 2:
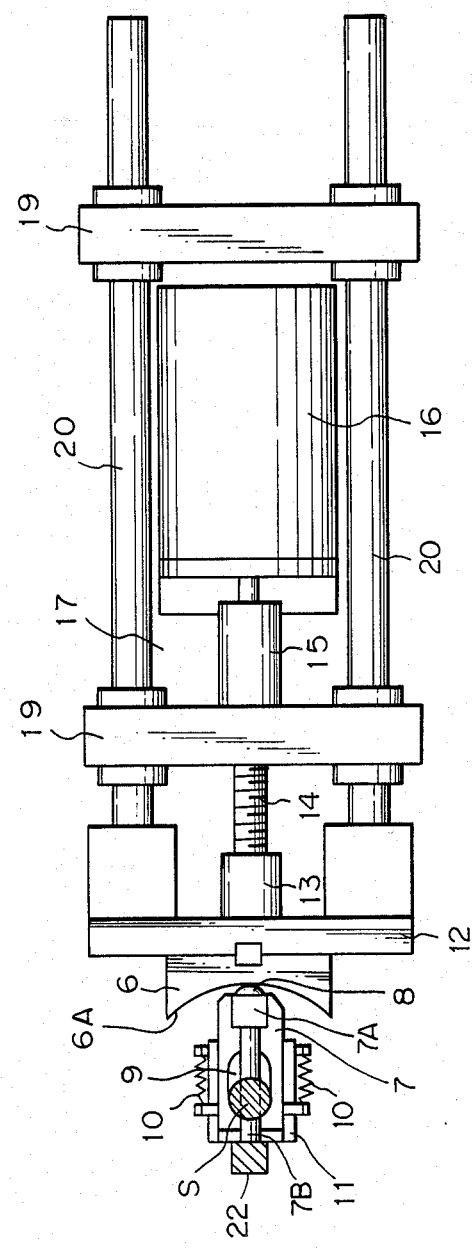
FIG. 2 is a plan view, partly omitted, of the winder shown in FIG. 1.

In FIGS. 1 and 2, an upright spindle S is supported by a drive unit 21 on a base 17 and driven for vertical movement and a horizontal rotation. A guide block 11 is securely mounted to the spindle S via set screws 31 and 32. A slide block 7 is mounted to the guide block 11 in a horizontally slidable arrangement. For free passage of the spindle S, the slide block 7 is provided with a slot 9 which extends in the sliding direction of the slide block 7. A ball plunger 7A is coupled in one body to the slide block 7. This ball plunger is provided at its one end with a ball 8 and at its other end with an elongated projection 7B which extends diametrically through the spindle S. A pair of tension springs 10 are interposed between the slide block 7 and the guide block 11 in order to constantly keep the ball 8 on the ball plunger 7A in elastic pressure contact with a concave cam face 6A of a cam 6.

The cam 6 is held by an upright cam holder 12 which is provided at its lower end with a ball nut 13. This ball nut 13 is in screw engagement with a horizontal ball screw 14 which is operationally coupled to a drive motor 16 via a coupler 15. The cam holder 12 is supported by a pair of parallel horizontal guide shafts 20 which are held for axial sliding by bearings in transverse beams 19 on upright stands 18.

In a position somewhat above the slide guide 7, is a nozzle block 23 secured to the spindle S via a set screw 24 and a nozzle holder 22 is pivoted at its middle by a horizontal pin 25 on the nozzle block 23. The lower end of the nozzle holder 22 is in engagement with the free end of the extension 7B of the ball plunger 7A, as result of conventional means (not shown). The upper end of the holder 22 carries a nozzle 26 for a wire W.

The drive unit 21 drives the spindle S for a vertical movement and a horizontal rotation under control of a proper given program.

Figure 3:
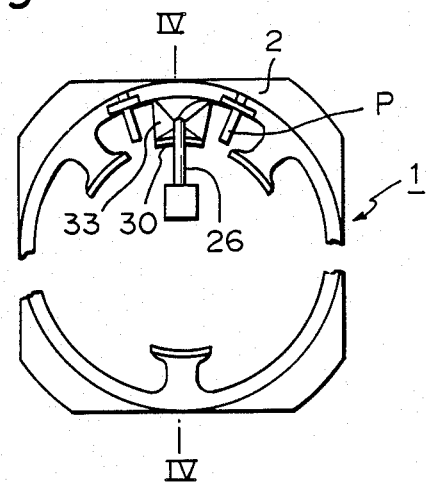
FIG. 3 is a plan view of the relative position between the nozzle of the winder and a terminal pin on a stator, during wire winding.
Figure 4:
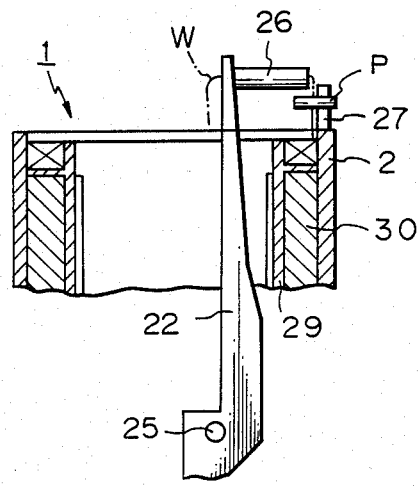
FIG. 4 is a section taken along a line IV—IV in FIG. 3.

The relative position between the nozzle 26 and a terminal pin P during wire winding is shown in FIGS. 3 and 4. The terminal pin P is held horizontally, directed towards the center of a stator 1, by a pole 27 arranged upright on a shell 2 of the stator 1. A stator core 30 and a field winding 33 are separated by an insulator 29.

Figure 5:
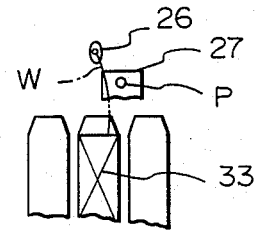
FIG. 5 shows the relative position between the nozzle and the terminal pin after the first step of wire winding.

The wire winder of the above-described construction operates as follows;

As the drive motor 16 drives the ball screw 14 in one direction, the cam 6 held by the cam holder 12 advances towards the spindle S (leftwards in the drawings) and pushes the ball plunger 7A via the ball 8 in pressure contact with the cam face 6A of the cam 6. As a result, the extension 7B of the ball plunger 7A pushes the lower end of the nozzle holder 22 away from the spindle S and the nozzle holder 22 swings about the pin 25 on the nozzle block 23 so as to bring the nozzle 26 towards the terminal pin P on the stator 1 in FIG. 4. Concurrently with this swinging motion of the nozzle holder 22, the spindle S carrying the nozzle holder 22 via the nozzle block 23 is driven upward by the drive unit 21. As a consequence, the nozzle 26 on the nozzle holder 22 undergoes compound movement which causes 4 to wind the wire W around the stator core 30 for formation of the field winding 33. Thus the nozzle 26 terminates the first step of wire winding and assumes a position shown in FIG. 5 relative to the terminal pin P.

Figure 6A:
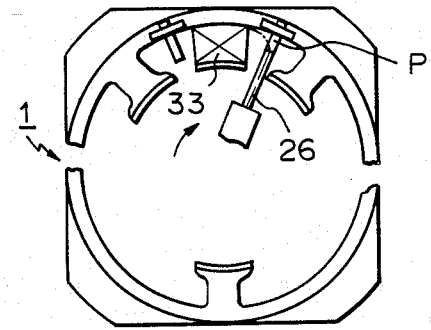
FIGS. 6A and 6B show the relative position between the nozzle and the terminal pin after the second step of wire winding
Figure 6B:
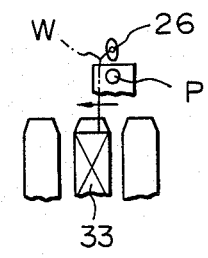

Next, in the second step of wire winding, the spindle S is driven for the horizontal rotation in one direction by the drive unit 21 so that the nozzle 26 should be located right above the terminal pin as shown in FIGS. 6A and 6B.

Figure 7A:
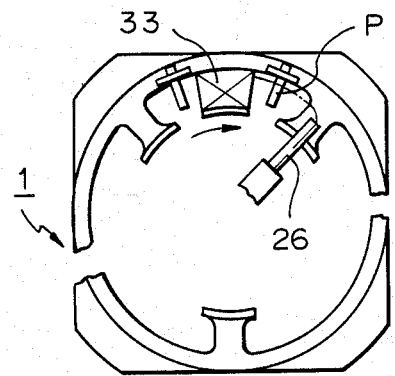
FIGS. 7A and 7B show the relative position between the nozzle and the terminal pin during the third step of wire winding.
Figure 7B:
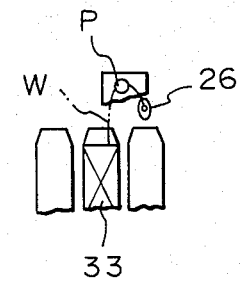

In the third step of wire winding, the spindle S is driven for horizontal rotation further in the one direction by the drive unit 21 so that the nozzle 26 is located past the terminal pin P as shown in FIG. 7A. After passing the position of the terminal pin P, the spindle S is then driven down by the drive unit 21 so that the wire W held by the nozzle 26 should be wound about the terminal pin P from the upper side as shown in FIG. 7B.

Figure 8A:
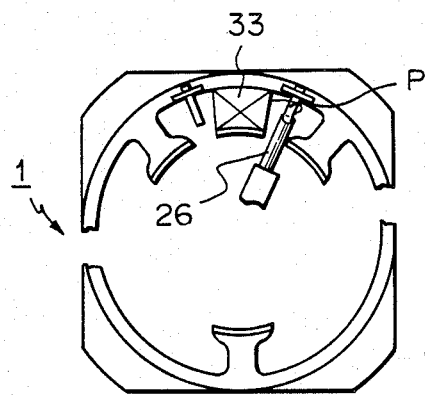
FIGS. 8A and 8B show the relative position between the nozzle and the terminal pin during the fourth step of wire winding.
Figure 8B:
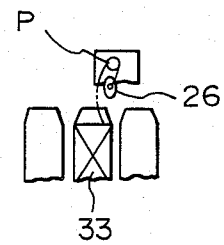

In the fourth step of wire winding, the spindle S is rotated horizontally in the other direction as shown in FIG. 8A so that the nozzle 26 resumes the position before the third step (see FIG. 6A). Thereafter, the spindle S is again driven down by the drive unit 21 so that it should be located right below the terminal pin P as shown in FIG. 8B.

Figure 9A:
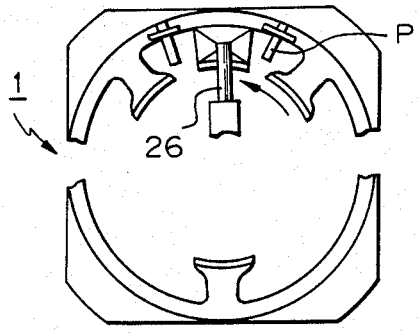
FIGS. 9A and 9B show the relative position between the nozzle and the terminal pin during the fifth steps of wire winding.
Figure 9B:
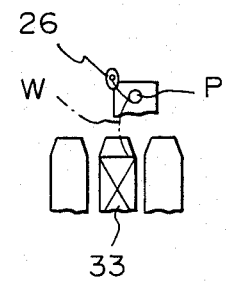

Next, in the final step of wire winding, the spindle S is rotated horizontally further in the other direction as shown in FIG. 9A so that the nozzle 26 should resume the position shown in FIG. 3. Next, the spindle S is driven upwardly so that the wire W should be fully wound about the terminal pin P as shown in FIG. 9B.

By sequentially repeating the above-described five steps of wire winding, the wire W is wound several times on the terminal pin P in a continuous fashion to form the field winding 33.

We claim:

1. A wire winding system for winding a wire sequentially on a pole and a terminal pin of a stator, the wire winding system comprising:
    an upright spindle;
    spindle moving means effective for selectively moving the spindle vertically and rotatably, including for rotating the spindle in first and second directions;
    a guide block and a nozzle block secured to said spindle;
    a slide block mounted to said guide block in a horizontally slidable arrangement;
    a nozzle holder pivotably mounted to said nozzle block and including, at a top end thereof, a nozzle for guiding a wire;
    a ball plunger secured to said slide block and having at one end thereof a ball and at another end thereof an extension which is in contact with a lower end of said nozzle holder and arranged such that the spindle is located, between said one end and said another end of said ball plunger;
    a cam having a cam surface disposed in spaced relationship to said upright spindle, said ball plunger being movable along and guided by said cam surface; and
    cam moving means for moving said cam selectively toward or away from said spindle; and
    means for controlling said spindle moving means and said cam moving means in conjunction with one another in a manner to cause said nozzle on said nozzle holder to wind a wire on the pole and to thereafter rotate said spindle to cause the nozzle to assume a position near the terminal pin and further to cause said cam moving means to move said cam to thereby pivot said nozzle holder such as to cause said nozzle to assume a predetermined position relative to the terminal pin and said controlling means being further effective to cause at least one loop of wire to be wound upon the terminal pin.

2. The wire winding system of claim 1, wherein said cam moving means includes a cam holder for holding said cam and a ball nut in screw engagement with a ball screw and means for rotating said ball screw to cause said cam to move selectively toward or away from said spindle.

* * * * *